March 13, 1928.  
E. R. MORTON  
ELECTRIC REGULATOR  
Filed March 12, 1925

1,662,252

Inventor:  
Edmund R. Morton  
by E.W.Adams Att'y.

Patented Mar. 13, 1928.

1,662,252

UNITED STATES PATENT OFFICE.

EDMUND R. MORTON, OF NEW YORK, N. Y., ASSIGNOR, BY MESNE ASSIGNMENTS, TO WESTERN ELECTRIC COMPANY, INCORPORATED, A CORPORATION OF NEW YORK.

ELECTRIC REGULATOR.

Application filed March 12, 1925. Serial No. 14,930.

This invention relates to electric regulators, particularly electron tube regulators for electric generators and the like.

It is an object of this invention to increase the sensitivity and precision of electric regulators.

One feature of this invention consists in employing a two-element space discharge device, the space current of which is varied in response to fluctuations in a condition of the generator to be regulated for controlling the grid potential of a three-element space discharge device, which in turn regulates the current in an auxiliary field winding.

Another feature of this invention consists in a circuit arrangement for making the cathode temperature of an electron tube regulator not only responsive to fluctuations in a characteristic of the circuit regulated, but also to changes in its own space current so as to give a cumulative regulating effect. This arrangement gives very precise regulation, as well as making it possible to obtain over, flat or decreasing regulation as is desired.

This invention in one embodiment comprises a two-element electron tube having its cathode connected in series with a resistance across the terminals of a generator, a three-element tube having a field winding and a portion of the resistance in series with the cathode of the first tube connected in its space current circuit and circuit arrangements so that the potential of its grid is controlled by the space current of the first tube.

Figure 1:
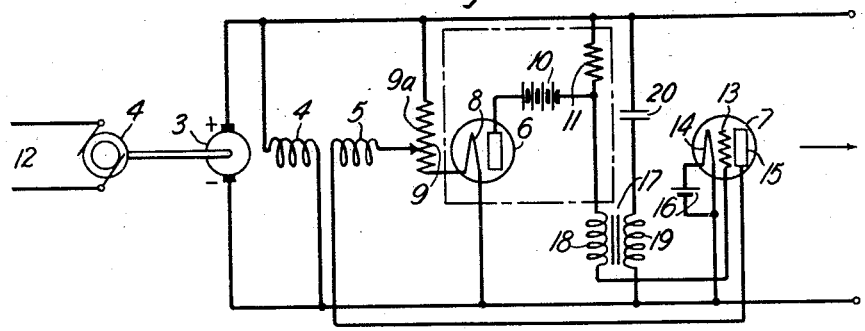
Figure 2:
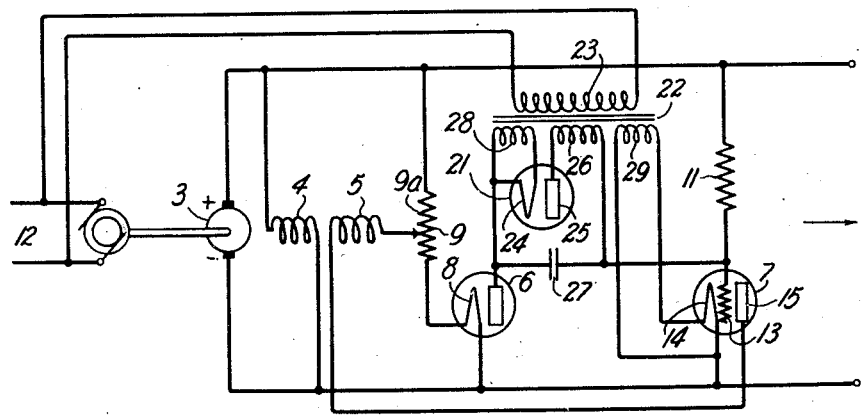

This invention can be more readily understood by reference to the following description in connection with the drawing in which Fig. 1 shows one embodiment of the invention; Fig. 2 shows another embodiment employing a rectifier for supplying space current to the two-element tube, and Fig. 3 a circuit arrangement whereby the two-element tube may be used as its own rectifier.

A direct current generator 3 driven by an alternating current motor 4 which receives current from a line 12 is shown in connection with a regulator circuit for controlling the generator voltage. The generator is excited by means of a main field winding 4. Regulation is obtained by means of an auxiliary aiding field winding 5, the current through which is controlled by means of a two-element vacuum tube 6 and a three-element vacuum tube 7. The tube 6 has its cathode 8 connected in series with the resistance 9 across the terminals of the generator. Space current is supplied to this tube from a battery 10, connected in series with a resistance 11. The grid 13 of the three-element tube 7 is connected to the junction of battery 10 and resistance 11 so that its potential with respect to the cathode 14 is determined by the space current of the tube 6. The cathode 14 receives heating current from a battery 16 or equivalent and is directly connected to the negative terminal of the generator. The plate 15 is connected through the auxiliary winding 5 and a portion of resistance 9 to the positive terminal of the generator.

The method in which the circuit above described operates is as follows: The filament of the first tube 6 is operated at a temperature below normal, so that the space current of the tube is limited by the electron emission and is independent of the plate voltage As is well known a tube under these conditions gives a relatively large change in the space current for a small change in the filament current, the ratio being to the order of 20:1. As the filament is connected across the terminals of the generator in series with resistance 9, if the voltage of the generator tends to increase, for example, the filament will tend to become hotter and the space current through the tube will rise, causing an increased drop in the resistance 11. The difference between the valve of this drop and the voltage of the generator is supplied to the grid of the tube 7. The tendency to increase in the generator voltage therefore causes the grid of the tube 7 to become more negative, thus producing a decrease in the space current of the tube and of the current through field winding 5, thereby weakening the field of the generator and restricting the tendency of the voltage to increase. The circuit is so arranged that the space current of the tube 7 passes through a portion 9$^a$ of resistance 9. Therefore, the voltage across the cathode 8 and consequently the current therethrough is determined by the drop in the portion 9$^a$. For example, an increase in the impedance of the tube 7 produced by an increase in the voltage of the generator will cause a decrease in the drop in the portion 9$^a$ and therefore an increase in the current through the cathode 8, thus giving a cumulative regulating effect. By adjusting the percentage of resistance 9 included in the portion 9ᵃ by adjusting the point to which the terminal of the winding 5 is connected, it is possible to secure an increase in the generator voltage with load, flat regulation or decrease.

In order to still further limit the tendency of the generator voltage to fluctuate a transformer 17 may be used, the secondary winding 18 of which is connected to the grid circuit of the tube 13, the primary winding 19 being connected, in series with a condenser 20, across the generator terminals. Consequently, if the voltage of the generator tends to fluctuate, an E. M. F. is developed in the secondary of this transformer which is proportional, not to the absolute value of the generator voltage, but to the rate of change of that voltage. Therefore, if the generator voltage tends to change in either direction, the transformer 17 applies an E. M. F. on the grid of the tube in such a direction as to oppose the change and prevent hunting action. In other words, this transformer is the electrical equivalent of the inertia type of governor employed on engines in combination with the customary fly-ball governor. Thus, the circuit regulates not only the steady state voltage, but also limits transient surges to a minimum amount.

Fig. 2 shows an embodiment in which the battery 10 is replaced by circuit arrangements for rectifying alternating current from the line 12, for example, for supplying space current to the tube 6. This arrangement comprises a two-element tube 21 and a transformer 22, the primary 23 of which is connected to an alternating current source. The plate of the tube 6 is connected to the cathode 24 of tube 21, the plate 25 of which is connected through the secondary winding 26 of transformer 22 to the grid 13 of the tube 7. A condenser 27 is shunted across tube 21 and the secondary 26 to eliminate the alternating current ripples. The cathodes 21 and 14 are shown heated by means of alternating current supplied from the secondary windings 28 and 29 inductively associated with the primary winding 23. In other respects the circuit of Fig. 2 is the same as that of Fig. 1 except for the transformer 17 which is omitted.

Figure 3:
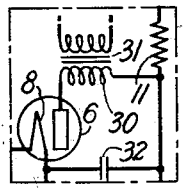

Fig. 3 shows a circuit arrangement by which alternating current may be used for supplying space current to the tube 6 which acts as its own rectifier. The battery 10 is replaced by the secondary winding 30 of a transformer 31, the primary of which is connected to an alternating current source such as the line 12. A condenser 32 is shunted across the tube and the secondary winding for eliminating the alternating current ripples.

By means of the regulator circuit above described, it has been found that the voltage of a 130 volt half horse-power motor generator can be regulated so that between no load and full load, the variation in voltage was less than the .05 volts.

It is obvious that this invention may be embodied in various other arrangements as, for example, the regulation of an alternating current generator without in any way departing from the spirit of the invention as defined in the appended claims.

What is claimed is:

1. A regulator for an electric circuit comprising a space discharge device having a plurality of electrodes, means for supplying space current to said device, means for varying the space current of said device in response to variations in a characteristic of said circuit, and means for regulating said circuit through the intermediary of variations in the space current of said device to limit said variations in a characteristic of said circuit and for simultaneously varying the space current of said device to give a cumulative regulating effect.

2. A regulator for an electric circuit comprising a space discharge device, means for supplying space current to said device, circuit arrangements for varying the space current of said device in response to variations in a characteristic of said circuit, a second space discharge device, circuit arrangements for supplying space current to said second device, means for controlling the space current of said second device in response to variations in the space current of said first device, and means for regulating a characteristic of said circuit and the space current of said first device in response to changes in the space current of said second device.

3. A regulator for an electric circuit comprising a space discharge device having a thermionic cathode, means for controlling the heating current supplied to said cathode in response to fluctuations in a characteristic of said circuit, a second space discharge device, means for controlling the space current of said second device in response to changes in the space current of said first device, and means for controlling said characteristic of said circuit and the heating current supplied to said cathode in response to changes in the space current of said second device to give a cumulative regulating effect.

4. A regulator for an electric circuit comprising a space discharge device, means for controlling the space current of said device in response to fluctuations in a characteristic of said circuit, a second space discharge device, connections for supplying space current for said second device from said circuit, means for controlling the space current of said second device in response to changes in the space current of said first device, and means for simultaneously controlling the characteristic of said circuit and the space current of said first device in response to changes in the space current of said second device to give a cumulative regulating effect.

5. A regulator for an electric circuit comprising a space discharge device having a thermionic cathode, said cathode being connected to said circuit in series with a resistance, means for supplying space current to said device, a second space discharge device, means for controlling a characteristic of said circuit, conections including said means and at least a portion of said resistance for supplying space current to said second device from said circuit, and means for controlling the space current of said second device in response to changes in the space current of said first device.

6. The combination with a dynamo electric machine having a field winding, of thermionic means having a cathode affected by the current generated by said machine, a space discharge device having a control electrode, connections including said space discharge device and said winding for supplying space current to said device, circuit arrangements to vary the strength of said current and consequently a characteristic of said machine by controlling the potential of said control electrode in response to changes in the space current of said thermionic means and means reacting on said space discharge device upon change in the space current and the characteristic of the machine to prevent hunting action.

7. A regulator for an electric generator having a field winding comprising a space discharge device having a thermionic cathode, means for supplying space current to said device, connections including a resistance for supplying to said cathode current from said generator, a second space discharge device having a control electrode, a space current circuit for said second device including said field winding and at least a portion of said resistance, and connections for controlling the potential of said control electrode in response to variations in the space current of said first device.

8. A regulator for an electric generator having a field winding comprising a space discharge device having a thermionic cathode, a space current circuit for said device including a source of space current and a resistance, connections including a second resistance for supplying to said cathode current from said generator, a second space discharge device having a control electrode, connections for supplying space current from said generator to said second device including said field winding and at least a portion of said second resistance, and a connection from a point between said source of space current and said first resistance to the control electrode for controlling the space current of said second device.

9. A combination according to claim 8 in which said source of space current comprises a transformer having its secondary connected in the space current circuit of said device.

10. A combination according to claim 8 in which the portion of said second resistance included in the space current circuit of said second device is adjustable to control the regulation of the generator.

11. In combination, a dynamo electric machine having a main field winding and an auxiliary aiding field winding, a thermionic device having a cathode having its temperature affected by a characteristic of said machine, a space discharge device having a control electrode, a circuit including said auxiliary field winding for supplying current to said space discharge device, means for varying the potential of said control electrode to vary the strength of said current in accordance with the changes in the space current of said thermionic device, and means reacting on said space discharge device in accordance with the change of the characteristic of said machine.

12. In combination, an electric generator having a main field winding and an auxiliary aiding field winding, a resistance, an electron tube having a thermionic cathode connected in series with said resistance to the terminals of said machine for receiving heating current therefrom, a second electron tube having a control electrode, means for influencing the potential of said control electrode in accordance with changes in the space current of said first electron tube, and connections including said auxiliary field winding, a portion of said resistance and the terminals of said machine for supplying space current to said second electron tube.

13. A regulator for a dynamo electric machine, having a regulating field winding, comprising a space discharge device, a source of space current for said device, means for controlling the space current of said device in response to fluctuations in a characteristic of said machine, an impedance connected in the space current circuit of such device, a second space discharge device having a cathode, an anode and a control electrode, a source of space current for said device, connections for applying a polarizing potential to said control electrode, circuit arrangements for impressing on the control electrode the difference between the polarizing potential and the potential drop in said impedance for controlling the space current of said second device, and connections for including said regulating field winding in the space current circuit of said second device.

14. In a regulator system for a dynamo electric machine, a space discharge device, means responsive to variation in a characteristic of the machine for controlling the space discharge device, means governed by the space discharge device for controlling said characteristic of the machine, and means reacting on said space discharge device upon change in the characteristic of said machine to prevent hunting action.

15. In a regulator system for controlling a characteristic of a dynamo electric machine, a space discharge device, means responsive to variation in the characteristic of the machine for controlling the space discharge device, means governed by the space discharge device for controlling said characteristic of the machine, and means responsive to the rate of change of said characteristic for controlling said space discharge device to prevent hunting action.

16. In a regulator system for a dynamo electric machine, a space discharge device, means responsive to a variation in a characteristic of the machine for controlling the space discharge device, means operating independently of moving parts and governed by said space discharge device for controlling said characteristic of the machine, and means reacting on said space discharge device upon change in the characteristic of the machine to prevent hunting action.

17. In a regulator system for a dynamo electric machine, a space discharge device having an anode, a cathode, and a grid element, means responsive to a variation in a characteristic of said machine for controlling the potential on the grid of said device, and means governed by said space discharge device for controlling said characteristic of the machine and for reacting on the grid of said device to prevent hunting action.

18. A regulating arrangement comprising an electric machine to be regulated, an electric machine field winding for controlling said machine, a space discharge device, means responsive to a variation in a characteristic of said machine for controlling said device, means comprising a circuit including said field winding and said device for controlling said characteristic of the machine, and means for reacting on said device to prevent hunting action.

19. A regulating arrangement comprising an electric machine to be regulated, a space discharge device, means responsive to a variation in a characteristic of the machine for controlling said device, and means governed by said device for controlling said characteristic of the machine and for preventing hunting by reacting on said device in an amount which varies substantially simultaneously with the rate of change in a characteristic of said machine.

20. A regulating arrangement comprising an electric machine to be regulated, a space discharge device, means responsive to a variation in a characteristic of the machine for controlling said device, and means governed by the said device and operating independently of vibrating contacts for controlling said characteristic of the machine and for reacting on said device to prevent hunting action.

21. In a regulator system for controlling a characteristic of a dynamo electric machine, a controlling field winding for said machine, a three element space discharge device, means responsive to a variation in a characteristic of said machine for controlling said device, and means governed by said space discharge device for controlling said characteristic of the machine and for reacting on said device according to the variation of said characteristic to prevent hunting action.

22. In a regulator system, a dynamo electric machine, means for maintaining an operating characteristic of said machine substantially constant and comprising a three element vacuum tube, and means for impressing a potential on the grid of said tube which varies inversely with the current flowing through the tube to effect a compensating action.

23. In a regulator system, a dynamo electric machine having a field winding for regulating an operating characteristic thereof, means comprising a three element vacuum tube for controlling the excitation of said field winding in accordance with the operating characteristic of the machine, and means for applying a potential varying inversely with the space current of the tube to one element of the tube, said potential applied to one element of the tube serving to effect a compensating action.

24. In a regulator system, a dynamo electric machine, a space discharge device, means responsive to variation in a characteristic of said machine for controlling said device, and means governed by said space discharge device for controlling the said characteristic of the machine and for impressing a potential on said device to prevent hunting action.

In witness whereof, I hereunto subscribe my name this 27th day of February, A. D. 1925.

EDMUND R. MORTON,